United States Patent [19]

Banks et al.

[11] Patent Number: 5,287,918
[45] Date of Patent: Feb. 22, 1994

[54] HEAT EXCHANGERS

[75] Inventors: Simon A. Banks, Derby; Alistair Calderwood, Nottingham; James E. Boardman, Lancashire; Colin I. Adderley, Derby; John O. Fowler, Lancashire, all of England

[73] Assignee: Rolls-Royce plc, London, England

[21] Appl. No.: 22,880

[22] Filed: Feb. 24, 1993

Related U.S. Application Data

[63] Continuation of Ser. No. 708,014, Jun. 3, 1991, abandoned.

[30] Foreign Application Priority Data

Jun. 6, 1990 [GB] United Kingdom ............ 9012618.6

[51] Int. Cl.⁵ ............................................. F28F 3/14
[52] U.S. Cl. ................... 165/166; 29/890.042; 228/183; 165/165
[58] Field of Search ............. 165/165, 166, 167; 29/890.042; 228/183

[56] References Cited

U.S. PATENT DOCUMENTS

| | | | |
|---|---|---|---|
| 2,553,030 | 5/1951 | Bell | 165/166 |
| 2,596,008 | 5/1952 | Collins | 165/166 X |
| 2,766,514 | 10/1956 | Adams | 165/166 X |
| 2,845,695 | 8/1958 | Grenell | 29/890.042 |
| 2,859,509 | 11/1961 | Adams | 29/890.042 |
| 2,999,306 | 9/1961 | Baxter | 29/890.042 |
| 3,024,002 | 3/1962 | Beck | 165/166 |
| 3,067,492 | 12/1962 | Johnson et al. | 29/890.042 |
| 3,136,037 | 6/1964 | Solnick et al. | 29/890.042 |
| 3,194,309 | 7/1965 | Adams | 165/170 |
| 3,205,563 | 9/1965 | Pauls et al. | 29/890.042 |
| 3,291,206 | 12/1966 | Nicholson | 165/166 |
| 3,297,082 | 1/1967 | Tranel et al. | 165/170 |
| 3,458,917 | 8/1969 | Mueller | 29/890.042 |
| 3,895,436 | 7/1975 | Summers et al. | 228/157 |
| 3,924,793 | 12/1975 | Summers et al. | 228/157 |
| 3,927,817 | 12/1975 | Hamilton et al. | 228/157 |
| 4,120,351 | 10/1978 | Kleine et al. | 165/170 |
| 4,220,276 | 9/1980 | Weisert et al. | 228/118 |
| 4,303,570 | 12/1981 | Weisert et al. | 260/31.2 R |
| 4,351,470 | 9/1982 | Swadling et al. | 228/157 |
| 4,396,057 | 8/1983 | Berntell et al. | 165/4 |
| 4,422,569 | 12/1983 | Payne et al. | 228/173 C |
| 4,534,503 | 8/1985 | Stephen et al. | 228/157 |
| 4,549,685 | 10/1985 | Paez | 228/118 |
| 4,607,783 | 8/1986 | Mainsbridge et al. | 228/265 |
| 4,632,296 | 12/1986 | Mainsbridge et al. | 228/157 |
| 4,820,355 | 4/1989 | Bampton | 148/11.5 A |
| 5,070,607 | 12/1991 | Boardman et al. | 29/890.042 |

FOREIGN PATENT DOCUMENTS

| | | |
|---|---|---|
| 294536 | 11/1971 | Austria . |
| 602644 | 8/1960 | Canada . |
| 0130583 | 1/1985 | European Pat. Off. . |
| 0161892 | 5/1986 | European Pat. Off. . |

(List continued on next page.)

OTHER PUBLICATIONS

Article in "Chemical Engineer", Dec. 1986, pp. 36–38.
AGARD-LS-154 "Superplasticity" Sep. 1987.

Primary Examiner—Allen J. Flanigan
Attorney, Agent, or Firm—Cushman, Darby & Cushman

[57] ABSTRACT

A compact, high integrity heat exchanger element comprises a core layer through which the heat exchange fluid passes between its inlet and its outlet. The core layer includes a main heat exchange region containing heat exchange surfaces acting as fins. It also has distributor/ collector regions containing flow intercepting features for distributing or collecting the fluid flow over the width of the element. The heat exchange element consists of a minimum of two unitary sheets of metal joined by diffusion bonding in selected places. During manufacture, at least one of the unitary sheets has been superplastically deformed, in at least some of the places where it has not been diffusion bonded, so as to form the core layer complete with all its features in one operation.

3 Claims, 6 Drawing Sheets

FOREIGN PATENT DOCUMENTS

| | | | |
|---|---|---|---|
| 0358523 | 3/1990 | European Pat. Off. | |
| 0356142 | 11/1990 | European Pat. Off. | |
| 3104919 | 12/1981 | Fed. Rep. of Germany. | |
| 808844 | 2/1937 | France | 165/166 |
| 205038 | 1/1968 | U.S.S.R. | 165/166 |
| 1238491 | 7/1971 | United Kingdom | 165/166 |
| 1378421 | 12/1974 | United Kingdom. | |
| 1398929 | 6/1975 | United Kingdom. | |
| 1415510 | 11/1975 | United Kingdom. | |
| 1429054 | 3/1976 | United Kingdom. | |
| 1480168 | 7/1977 | United Kingdom. | |
| 1495655 | 12/1977 | United Kingdom. | |
| 1565092 | 4/1980 | United Kingdom. | |
| 2030480 | 4/1980 | United Kingdom. | |
| 2067532 | 7/1981 | United Kingdom. | |
| 2069391 | 8/1981 | United Kingdom. | |
| 2071547 | 9/1981 | United Kingdom. | |
| 2087774 | 6/1982 | United Kingdom. | |
| 2124520 | 7/1982 | United Kingdom. | |
| 2095137 | 9/1982 | United Kingdom. | |
| 2129340 | 5/1984 | United Kingdom. | |
| 2135219 | 8/1984 | United Kingdom. | |
| 2144656 | 3/1985 | United Kingdom. | |
| 2150866 | 7/1985 | United Kingdom. | |
| 2155822 | 10/1985 | United Kingdom. | |
| 2158121 | 11/1985 | United Kingdom. | |
| 2173511 | 11/1986 | United Kingdom. | |
| 2203068 | 3/1988 | United Kingdom. | |

T = t + t

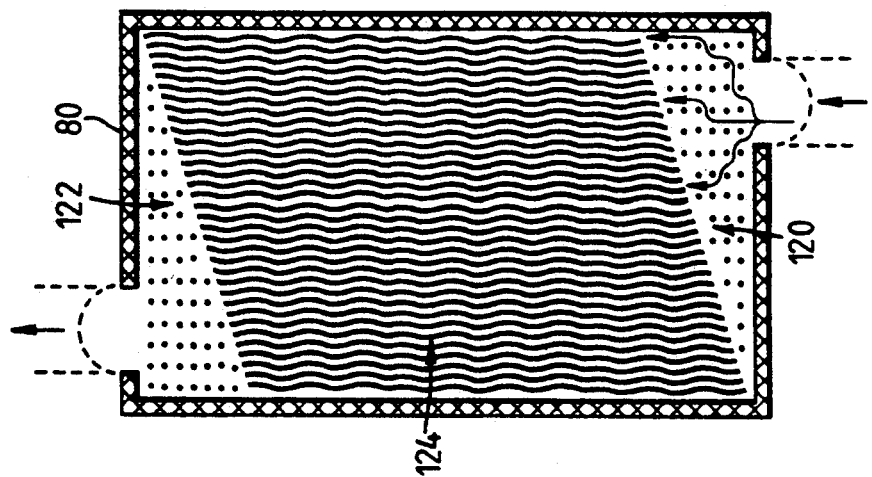
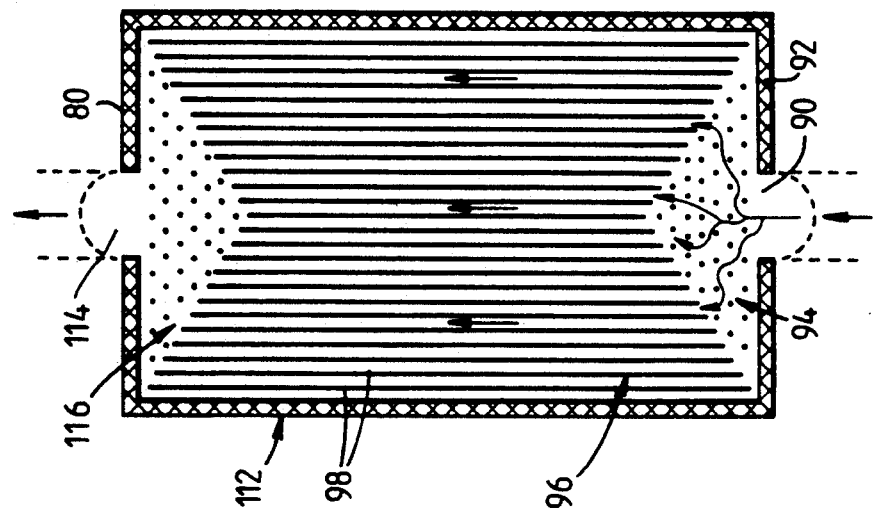
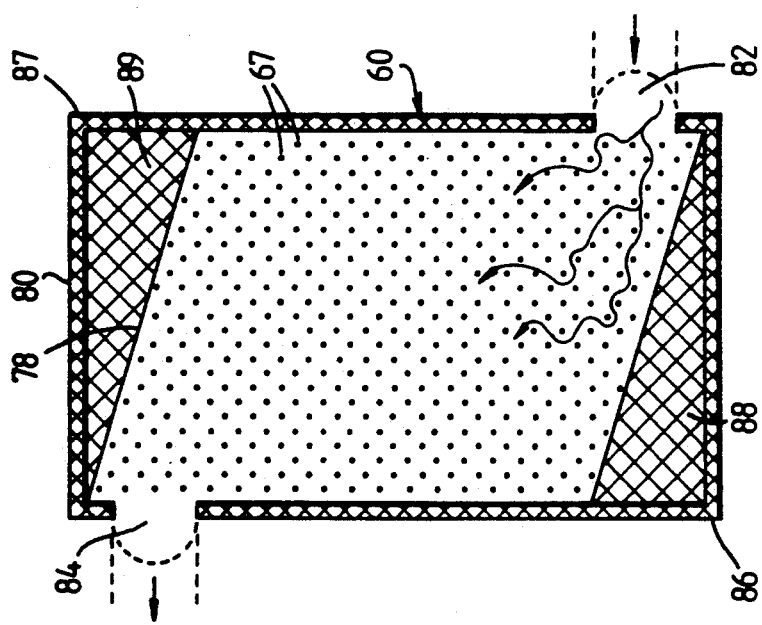

HEAT EXCHANGERS

This is a continuation of application Ser. No. 07/708,014, filed on Jun. 3, 1991, which was abandoned upon the filing hereof.

BACKGROUND OF THE INVENTION

This invention relates to compact heat exchangers of the type generally known as plate-fin heat exchangers, and in particular to the structure and manufacture of high-integrity heat exchanger elements for such heat exchangers.

General information on plate fin heat exchangers may be found, for example, in a 1983 publication entitled "Compact Heat Exchangers" by R.L. Webb, published by the Hemisphere Publishing Corporation and obtainable from the British Library at Boston Spa, Yorkshire, England. A more comprehensive guide is "Plate-Fin Heat Exchangers - A Guide to their Specification and Use", 1st. Edition, edited by M.A. Taylor and published in 1987 by the Heat Transfer And Fluid Flow Service (HTFS) of Harwell Laboratory, Harwell, England.

The core layer of a plate-fin heat exchanger element is the space between adjacent plates of the heat exchanger matrix through which the heat exchange fluid flows. The core layer contains the so-called fin elements which aid the heat exchange process as the heat exchange fluid flows past them. In some heat exchange configurations the fin elements effectively comprise partitions running longitudinally of the core layer to define discrete fluid flow passages extending between the inlet and outlet regions. In others they are discontinuous elements around which the heat exchange fluid flows between the inlet and outlet regions.

Plate-fin heat exchanger elements require an effective structure for distributing the flow of heat exchange fluid from the fluid inlet of the element evenly across the width of the core layer. Also required is structure for collecting the fluid from across the width of the core layer and concentrating it towards the outlet of the element. Both types of structure are similar and will be referred to as distributors and collectors in the following description and claims.

One known way of providing plate-fin heat exchanger elements with distributors and collectors is to braze corrugated sheets into the inlet and outlet regions of the elements, the corrugations being arranged to convey the flow from the inlet to the main heat exchange region comprising the fins and from the fins to the outlet. This is consonant with the prevailing practice in manufacture of plate-fin heat exchangers, which relies on assembling a multitude of parts into a multi-layer sandwich and brazing them together to produce a complete heat exchanger matrix.

The present invention seeks to provide elements for heat exchangers which have improved integrity, reduced complexity and reduced cost of fabrication in comparison with conventionally produced elements of the plate-fin type.

According to one aspect of the present invention, a heat exchanger element comprises
a core layer for flow of heat exchange fluid therethrough, and
fluid inlet and outlet means communicating with the core layer;
the core layer including
a main heat exchange region containing heat exchange surfaces, and
a distributor region containing flow intercepting surfaces, the distributor region extending between the main heat exchange region and the inlet means so as to distribute the fluid flow across the extent of the core layer;
the heat exchange element comprising at least two unitary sheets of metal joined by diffusion bonding in selected places, at least one unitary sheet having been superplastically deformed, in at least some of the places where it has not been diffusion bonded, so as to form the core layer and define therein the flow intercepting surfaces in the distributor region as well as the heat exchange surfaces in the main heat exchange region.

The flow intercepting surfaces in the distributor region may comprise corrugations in the at least one superplastically deformed sheet, the corrugations being arranged to convey the heat exchange fluid from the inlet means to the main heat exchange region; in this case the minimum number of sheets required to make a single heat exchanger element will be two.

If necessary, the at least one superplastically deformed sheet may have a relatively undeformed transitional portion between a part of itself which is deformed so as to define the heat exchange surfaces in the main heat exchange region and another part of itself which is deformed so as to define the flow intercepting surfaces in the distributor region.

Alternatively, and using a minimum of two sheets of metal joined by diffusion bonding in selected places, we have found that an effective way of distributing the fluid flow across the lateral extent of the core layer is to incorporate flow intercepting surfaces in the distributor region which comprise an array of superplastically formed hollow projections projecting outwardly from a side of the at least one superplastically deformed sheet, the ends of the projections being diffusion bonded to the adjacent sheet.

Preferably, however, the heat exchanger element comprises at least three unitary sheets of metal joined by diffusion bonding in selected places, the flow intercepting surfaces in the distributor region comprising first and second sets of superplastically formed hollow projections, the first set of hollow projections projecting outwardly from a first side of the at least one superplastically deformed sheet, and the second set of hollow projections projecting outwardly from a second side of the at least one superplastically deformed sheet, the ends of the projections being diffusion bonded to the two adjacent sheets.

We also prefer that the core layer additionally comprises a fluid collector region formed integrally with the main heat exchange region and the distributor region and containing flow intercepting surfaces, the collector region extending between the main heat exchange region and the outlet means so as to collect the fluid flow from across the extent of the core layer and concentrate it for flow through the fluid outlet means.

The invention also embraces heat exchanger matrices comprising heat exchanger elements as described above.

According to a further aspect of the present invention a manufacturing method for a heat exchanger element comprises the steps of:

(a) selecting at least two metal sheets for stacking together, at least one of the metal sheets being capable of being superplastically deformed to form an expanded core layer in the finished element for flow of heat exchange medium therethrough;

(b) applying anti-diffusion-bonding stop-off substance in selected interfacial areas of at least one of the sheets thereby to define where diffusion bonding of the sheets will not occur, said interfacial areas being selected to define heat exchange surfaces in a main heat exchange region of the core layer, fluid inlet and outlet means for the core layer, and flow intercepting surfaces in a flow distributor region between the main heat exchange region and the fluid inlet means;

(c) stacking the sheets together and applying heat and pressure across the stack thickness to diffusion bond the sheets together where there is no anti-diffusionbonding substance;

(d) cooling the resulting diffusion-bonded structure;

(e) pressurising the interior of the structure by injecting a suitable fluid to break adhesive bonds between the anti-diffusion-bonding substance and the sheets; and (f) heating the structure and pressurising its interior to superplastically deform said at least one metal sheet thereby simultaneously producing the heat exchange surfaces in the main heat exchange region and the flow intercepting surfaces in the flow distributor region.

Preferably, between steps (e) and (f) of the above method are inserted the consecutive additional steps of purging the resulting structure of contaminants using an inert fluid to do so; and evacuating the structure.

We prefer heat exchange elements according to the invention to have a flow collector region, extending between the main heat exchange region and the outlet means, in addition to a flow distributor region. In such a case, the anti-diffusion-bonding stop-off substance must be applied in step (b) of the above manufacturing method so as to define flow intercepting surfaces in the required flow collector region, whereby during the heating and pressurising step (f) the flow intercepting surfaces in the flow collector region are produced simultaneously with the heat exchange surfaces in the main heat exchange region and the flow intercepting surfaces in the flow distributor region.

BRIEF DESCRIPTION OF THE DRAWINGS

The invention will now be described, by way of example only, with reference to the accompanying drawings in which

FIGS. 4A to 4C are plan view sketches of planar sheets of metal having screen-printed stop-off patterns thereon to define various arrangements for heat exchange and distributor/collector regions within the core layers of heat exchange elements;

DETAILED DESCRIPTION OF THE INVENTION

Figure 1A:
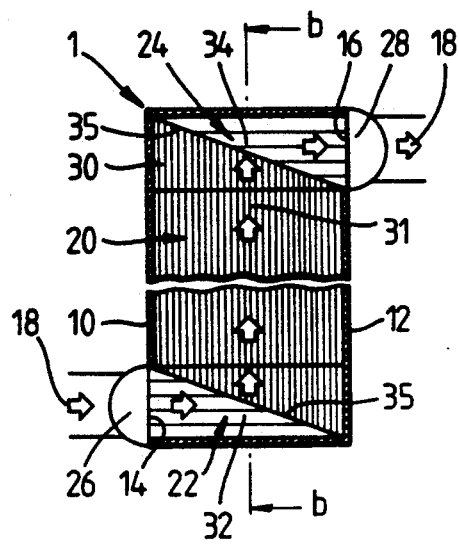
FIGS. 1A to 1E illustrate in diagrammatic sectional form four different known types of distributor/collector configurations for heat exchanger elements, FIG. 1B being a view on section line b—b in FIG. 1A.
Figure 1B:
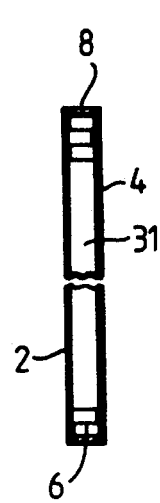

As illustrated, for example, in FIGS. 1A and 1B, a known simple type of plate-fin heat exchanger element 1 comprises front and back metal face plates 2 and 4, end plates 6,8 and side plates 10,12. These form a rectangular plan enclosure having inlet and outlet apertures 14,16 for heat exchange fluid 18. The enclosure is divided into three regions, namely: a main heat exchange region 20; an inlet flow distributor region 22 located between the inlet aperture 14 and the main heat exchange region 20; and an outlet flow collector region 24 located between the main heat exchange region and the outlet aperture 16.

The main heat exchange region 20 consists of a parallel series of fluid flow passages 30 extending longitudinally of the element These passages 30 comprise the spaces between parallel corrugations of a corrugated sheet metal core layer which is sandwiched between the front and back metal face plates 2 and 4 and brazed or welded into position where the peaks of the corrugations meet the face plates. The parts of the corrugations which form the partitions between adjacent channels can be characterised as continuous fins.

Similarly, the inlet and outlet flow distributor and collector regions 22,24 each comprise fluid flow passages 32,34 extending transversely of the passages 30, which are again formed by the corrugations of a corrugated sheet member brazed or welded into position. As explained previously, the distributor and collector passages 32,34 distribute or collect the flow across the width of the core layer. A simple transition between the longitudinal flow of fluid in the main heat exchange region 20 and the lateral flow in the inlet and outlet distributor and collector regions 22,24 is achieved by mitring the corrugated sheets where they meet at 35.

A complete heat exchanger matrix, capable of exchanging heat between two different fluid circuits, may be made by stacking a number of heat exchanger elements 1 and brazing them together. In a heat exchanger matrix the face plates 2 and 4 are usually termed separating plates because they serve to separate adjacent core layers in the matrix, adjacent core layers being brazed to opposite sides of a common separating plate.

A heat exchanger matrix should capable of exchanging heat between at least two different fluid circuits. This can be achieved most simply by making adjacent elements in the matrix belong to different fluid circuits. That is to say, the elements in different fluid circuits are intercalated with each other. This of course requires that the inlet and outlet apertures of those elements belonging to the same fluid circuit are in registration with each other so that they can receive fluid from, or exhaust fluid to, common connecting manifolds, such as inlet and outlet manifolds 26,28 in FIG. 1A. However, the inlet and outlet apertures of elements in different fluid circuits must be offset from registration in order to avoid the different inlet and outlet manifolds occupying the same space.

Figure 1C:
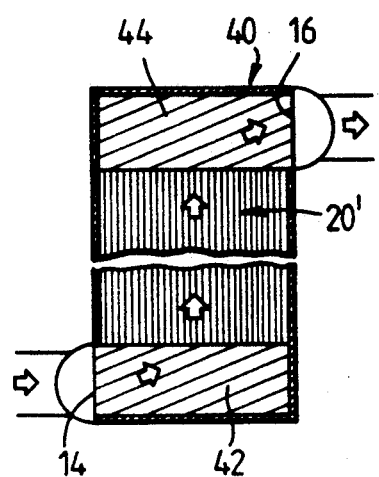
Figure 1D:
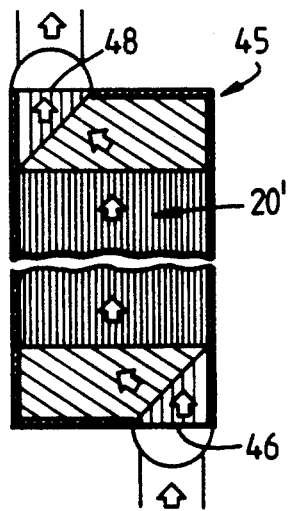
Figure 1E:
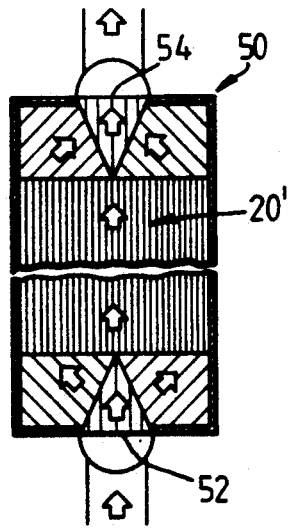

FIGS. 1C to 1E merely give other known examples of heat exchanger elements with constructions basically similar to that of FIGS. 1A and 1B but having differing configurations in their distributor and collector regions. Hence, the main heat exchange regions 20' in FIGS. 1C to 1E are all composed of longitudinal parallel passages. In FIG. 1C the heat exchanger element 40 has inlet and outlet apertures 14,16 located in the sides of the element as in FIG. 1A, but mitring of the corrugated sheets forming the passages is unnecessary because the distributor and collector passages 42,44 are angled transversely of both the lateral and longitudinal directions In FIG. 1D inlet and outlet apertures 46,48 are provided in the extremities of the top and bottom ends of the element 45 and flow turning and distribution/concentration are provided by corrugated sheet members comprising two sections mitred together as shown. Lastly, FIG. 1E shows an element 50 with distributor and collector regions comprising three corrugated sheet sections mitred together to obtain distribution and collection of fluid entering and leaving inlet and outlet apertures 52,54 provided centrally of the top and bottom ends of the element.

Commonly, the metal from which the various parts of the above heat exchange elements are produced is aluminium or stainless steel.

It will be appreciated from the above that even simple corrugated sheet designs for fins and distributors or collectors in the core layers of heat exchange elements involve appreciable manufacturing complexity and expense. For designs involving discontinuous fin members for increased heat exchange efficiency, the number of components needed for each core layer will be greater and manufacturing complexity and expense will be correspondingly greater.

This problem is much reduced by embodiments according to the present invention by producing the heat exchange element from a stack of flat metal sheets which have been diffusion bonded together in selected places and then subjected to a single superplastic forming operation in order to produce heat exchange and distributor/collector regions simultaneously within the core layer.

Figure 2A:
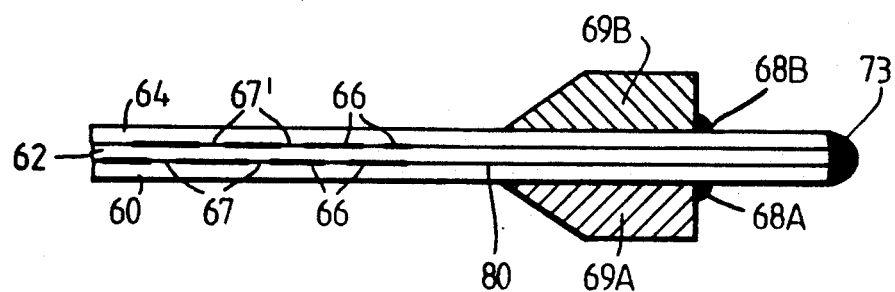
FIGS. 2A and 2B illustrate steps in the process of forming a heat exchanger element in accordance with one aspect of the present invention.
Figure 2B:
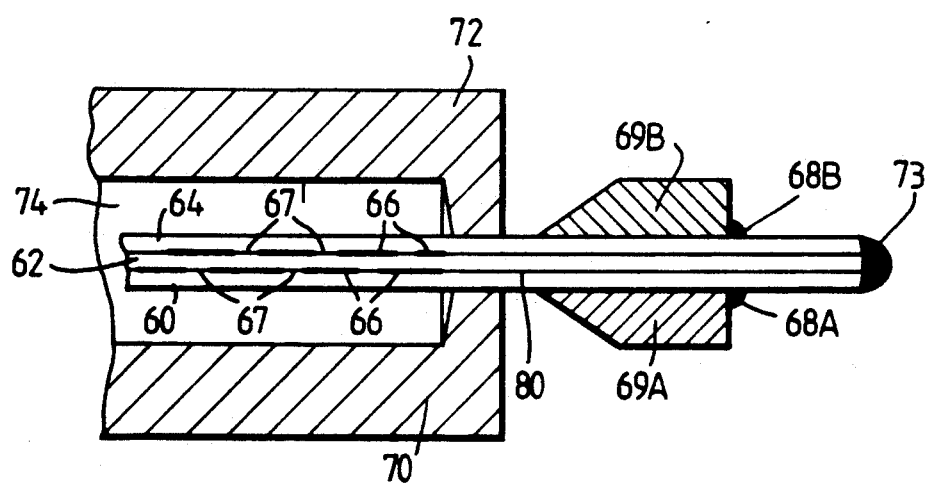

This production process will now be described with reference to FIGS. 2A and 2B. In FIG. 2A, three sheets of titanium 60,62,64 are stacked together so as to trap an end of a pipe (not shown) between two of the sheets in grooves or channels specially provided for the purpose. The pipe (not shown) is positioned so as to project from between the two sheets.

Prior to stacking the three sheets together, the middle one 62, which will become the core layer of the finished heat exchanger element, has had a stop off material applied to its faying faces, as indicated by the pattern of thick black lines 66 These indicate areas of stop-off surrounding small circular areas 67,67' where stop-off is absent. The thickness of the stop-off layer is of course exaggerated for clarity. The stop off may comprise powdered yttria in a binder and solvent e.g. the stop off known as "Stopyt 62A" which is sold by an American company named GTE Service Corporation.

The stop off material is applied in a desired pattern by the known silk screen printing process so as to ensure that eventually the three sheets can be separated at the places of application of the stop off, as will be described later Note that the pipe connects to an area of the stop-off.

A pair of titanium frames 69A and 69B are placed one each side of the sheets 60 and 64 and are welded thereto around their exterior peripheries at 68A and 68B. Then the stack of three sheets is welded about its periphery at 73 so as to be sealed except for the inlet provided by the piping (not shown). The assembly is placed in an autoclave and heated so as to "bake out" the solvent from the stop off material. This exhausts through the pipe, because care has been taken to ensure that no areas of stop-off are isolated from a path through other areas of stop-off back to the pipe. If necessary one or more small slots are provided through the thickness of the centre sheet 62 at its periphery in order to connect up areas of stop-off on one side of the sheet which are in communication with the pipe with areas of stop-off on the other side of the sheet which otherwise would not be.

Thereafter, the interior of the assembly is purged with argon and then evacuated via the pipe (not shown) and the pipe sealed.

The assembly is replaced in the autoclave and heated to about 925° C. The argon pressure in the autoclave is raised to about 300 lbs/sq.in (approximately 21 kg/sq.cm) and held at that temperature for about two hours. The temperature and pressure are then reduced to ambient and the assembly removed, diffusion bonding having been achieved.

Cracking is the next step, wherein argon at pressure is introduced via the piping into the area containing the stop off, in order to break the adhesive grip in the non-diffusion-bonded areas which the diffusion bonding pressure has brought about.

Cracking is achieved at this point in the process because the metal is elastic at room temperature and the minimal extension which occurs does not go beyond the elastic limit. Consequently, the structure regains its shape when pressure is removed at the end of the step.

If cracking is attempted whilst the structure is at the common diffusion bonding and superplastic forming temperature, there is serious risk of progressive plastic deformation lengthwise of the structure, rather than simultaneous deformation over the whole. In such circumstances, rupture frequently occurs.

The argon is carefully introduced to those areas which contain the stop off and proceeds to seep through the stop off and eventually reaches the opposing end of the structure.

The gas may initially be caused to travel along one side only of each sheet and on reaching the opposing end find a slot through the thickness of the middle sheet 62 and return to the inlet end via the other layer of stop off. In any event, the need is to ensure that the gas travels the whole length of the interior of the structure before internal pressure becomes such as to break the adhesion between the stop off and the sheets which results from the applied pressure during the diffusion bonding step.

To complete the forming of the structure into a heat exchanger element, the structure is placed within appropriately shaped split dies 70 and 72 as shown in FIG. 2C and the whole is positioned within an autoclave which is then evacuated so as to avoid contamination of the titanium structure. Spaces defined by the inner walls of the die and the outer surface of the structure are also reduced to zero pressure for reasons which are explained later.

The die and structure are again heated to a temperature of about 925° C. and then argon is introduced to the interior of the structure as described previously so as to force the three sheets apart in the areas which include the stop off and to force the parted portions of the outer sheets 60 and 64 into the respective die halves 70 and 72

Figure 3:
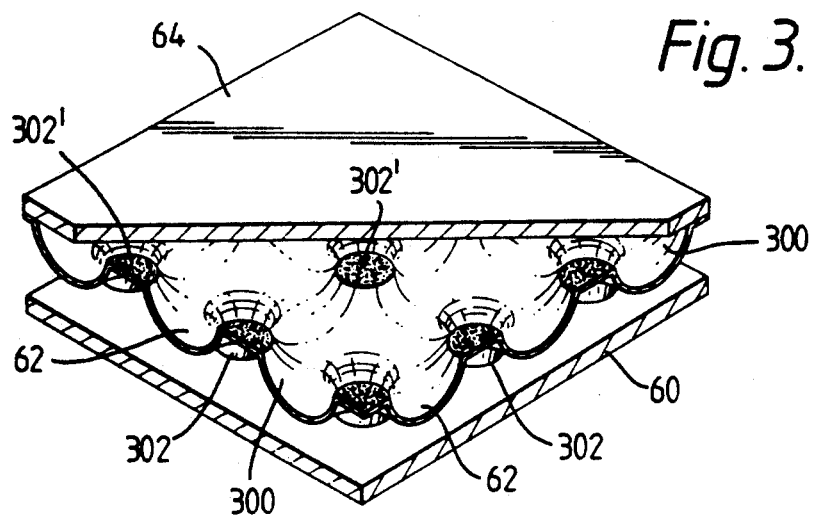
FIG. 3 shows in pictorial sectional view part of the heat exchanger element produced in FIGS. 2A and 2B.

The portions 67,67' of the middle sheet 62, which are diffusion bonded to the outer sheets 60,64 respectively, pull away from each other as the outer sheets expand into the die, thereby producing a core layer in the form shown in FIG. 3, comprising two sets of hollow projections 300 projecting outwardly from each side of the sheet 62. As will be seen from FIG. 3, each projection on a first side of the sheet 62 is equi distant from four opposing projections on a second side of the sheet. The ends 302,302' of the projections are diffusion bonded to the adjacent outer sheets 60,64 and of course correspond to the stop-off-free areas 67,67' of FIG. 2 Due to the fact that the gas pressure is the same on both sides of the middle sheet 62 while it is being formed, there will be no tendency for the resulting hollow forms to balloon or to be crushed. This is not the case for the outer sheets 60 and 64 since they are moving through an evacuated space until such time as they contact the walls of the dies, the shape of which, as previously stated, they then adopt.

The magnitude of the movement of the parts of the sheets being deformed is such as to require superplastic extension to occur. The term "superplastic" is a standard term in the metal forming art and will not be further explained.

In order to achieve superplastic forming without rupturing the thinning metal the gas is introduced in a series of constant volume pulses, at a pre-calculated rate which will achieve a desired strain rate, as is taught, for example, at pp.615–623 in the book "The Science, Technology and Application of Titanium", edited by RI Jaffe and NE Promisel, published by Pergamon Press in 1970, which is hereby incorporated by reference. The method ensures that the titanium is subjected to that strain rate which will achieve the maximum permissible speed of extension at any given point in the procedure. The rate of application of the gas pulses may thus vary during expansion of the sheets.

Again as taught in the publication mentioned above, the argon can be introduced in a continuous, but varying rate of flow so chosen as to ensure that the appropriate strain rate is applied to the titanium The inventors of this present invention however, have found that a pulsed flow wherein the pulses of gas are of identical volume, enables easier achievement of the desired strain rate.

On completion of forming, the inert atmosphere and the gas pressure within the structure is maintained whilst the structure is cooled to room temperature The structure is then removed from the autoclave and the piping removed, and is then ready for fitting to the fluid supplies which in operation will be in heat exchange relationship within the completed heat exchanger structure.

In considering now FIGS. 4A to 4C, it should be understood that in distinction from FIG. 2, the black or cross-hatched areas indicate absence of stop-off substance, not its presence. The disposable outer portions of the sheets and the titanium frames shown in FIG. 2 have been omitted from FIG. 4

The stop-off patterns applied include in each case a peripheral band 80 free of stop-off substance which defines the diffusion-bonded outer edges of the heat exchanger. This is also indicated in FIG. 2.

In FIG. 4A is shown a plan view of a metal sheet such as 60 in FIG. 2 provided with a screen-printed stop-off pattern as necessary to produce the core structure shown in FIG. 3 Sheet 64 (not shown in FIG. 4) is provided with a similar pattern, except of course that the dots 67', signifying the absence of stop-off substance, are offset from the similar dots 67 on sheet 60, as indicated in FIGS. 2 and 3, to produce the desired form of core layer.

It will be noted that in FIG. 4A, in common with FIGS. 4B and 4C, the positions of the inlet and outlet manifolds in the completed heat exchanger are indicated by broken lines. In FIG. 4A, the inlet aperture 82 defined by the stop-off pattern for this particular heat exchanger element is at the side of the element. In the completed heat exchanger, fluid will enter from the inlet manifold and be distributed throughout the core layer, as indicated by the meandering arrows, due to the deflecting effect of the exterior surfaces of the hollow projections 300 in the superplastically deformed core layer sheet 62 (FIG. 3). There is a gradual confluence or concentration of the fluid flow at the other end of the heat exchange region to exit from the outlet aperture 84 and into the outlet manifold. In this particular embodiment there is of course no identifiable boundary between the distributor/ collector regions and the main heat exchange region because the same type of core structure is utilised for all three regions.

In order to prevent the occurrence of regions of stagnation in the core layer near the corners 86,87 of the heat exchanger element, the core layer is not continued into these corners. Instead, triangular areas 88,89 are provided where there is no stop-off on any of the sheets. In these areas the sheets will be diffusion bonded together and the core layer will not be expanded during the inflation phase of manufacture. If convenient, the triangular areas 88,89 can be trimmed before the completed elements are incorporated into the final heat exchanger matrix.

It will of course be realised that collection or concentration of fluid flow at the outlet end of the element is not particularly aided by use of a dot core construction as such in the collector region. In the particular embodiment shown in FIG. 4A, collection of the heat exchange fluid, after its passage through the main body of the element, occurs along the boundary 78 between the unexpanded solid area 89 and the expanded core structure.

With the aid of the invention, a unitary plate-fin type of heat exchanger element can be manufactured by forming all the internal fluid deflecting and heat exchange surfaces of its heat exchange and distributor/collector regions in one superplastic forming operation to obtain a core layer in which the same expanded core layer structure adequately performs the functions of fin members in the main heat exchange portion of the element and distributor/collector members near the inlet and outlet. It will be noticed that the configuration of FIG. 4A achieves the same ends as the configurations shown in FIGS. 1A and 1B, but more simply.

For obvious reasons, core layers like 62 in FIG. 3 produced by stop-off patterns like that shown in FIG. 4A are referred to as "dot cores".

As shown in FIGS. 4B and 4C, it is easy to combine dot core inlet and outlet distributor and collector regions with other types of fin members in the main heat exchange region and with other types of inlet and outlet aperture arrangements. All that is necessary is to change the screen-printed pattern on the faying faces of the metal sheets which are going to be superplastically deformed.

Thus, in FIG. 4B the stop-off defines a central inlet aperture 90 in end 92 of the heat exchange element. The triangular inlet distributor region 94 comprises a dot core structure which achieves the same fluid distribution function as the prior art structure shown in FIG. 1E but without the need to braze or weld several preformed components together.

Figure 5:
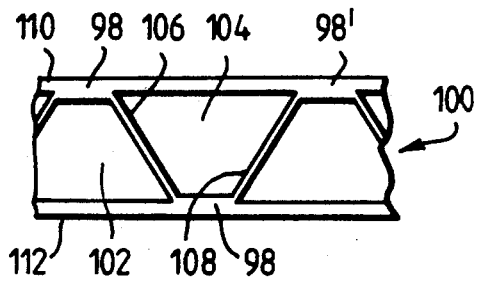

The dot-core inlet distributor region 94 transitions to linear continuous heat exchange surfaces (fin equivalents) in the main heat exchange region 96. The lines 98 actually represent stop-off-free bands on the inner face of one of the outer sheets 112 of a three-sheet stack. The inner face of the other one of the outer sheets is likewise provided with stop-off-free bands, but in plan view these are positioned between the bands on the first interface. A cross-section of the result after diffusion bonding and superplastic forming is shown in FIG. 5. It will be seen that the middle sheet comprising core layer. 100 has in effect become a corrugated sheet member defining fluid flow passages 102,104 between corrugations acting as fin members 106,108, but the corrugated sheet member is integral in the diffusion bonded areas 98',98 with the top and bottom facing sheet members 110,112 to achieve a unitary structure.

Near the outlet aperture 114 the linear fin members transition to another triangular dot-core collector region 116.

FIG. 4C again shows dot-core distributor and collector regions 120,122 arranged to achieve the same result as the prior art configuration shown in FIG. 1D. The stop-off pattern and resulting core layer structure for the main heat exchange region 124 is similar to that shown in FIGS. 4B and 5 except that waves or kinks have been introduced into the stop-off pattern to produce similarly shaped passages (fin members) in the expanded core layer. This will promote turbulence and improve heat transfer relative to the straight heat transfer surfaces produced by FIGS. 4B and 5.

In all three of the cases in FIG. 4, flow distribution and concentration is effected by a dot-core type of matrix in which the pitch and size of the stop-off free dots, and therefore of the hollow projections in the core layer, can be easily varied by varying the screen-printing pattern to suit the dimensions and pressure-drop requirements for any particular design or dimension of heat exchange element.

We have found that the dot-core arrangement is a very effective way of equalising the fluid flow across the core layer, but it is envisaged that the dot-core distributor and collector regions could alternatively be replaced by corrugated core layer distributor and collector regions patterned after those shown in FIG. 1, but integrally formed with the other components in accordance with the invention, similar to FIG. 5. In this case, it might be necessary to provide the core layer with a relatively undeformed transition portion between the distributor or collector region and the inlet or outlet end of the main heat exchange region. This would easily be achieved at the screen printing stage by providing a uniformly applied band of stop-off between the portions defining the two types of region. Such undeformed transitional portions would in effect provide header spaces between the two regions.

Figure 6:
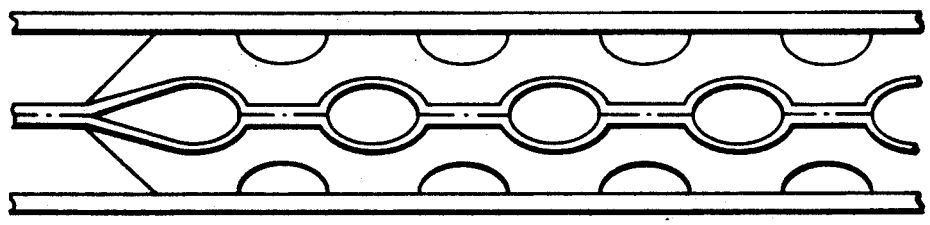
FIGS. 5 to 7 show cross-sections of some core layer configurations achievable in the present invention.
Figure 7:
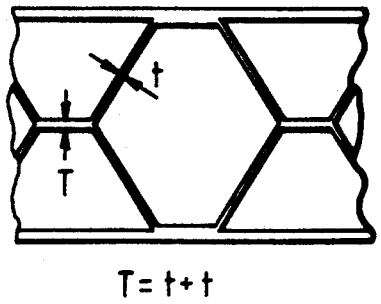

A stack of more than three sheets provided with suitable stop-off patterns enables more complex core layers to be produced. FIGS. 6 and 7 show two examples of such core layers. FIG. 6 is a four sheet stack in which the middle two sheets have been superplastically formed into a two-tier dot-core structure, and FIG. 7 is another four-sheet stack in which the middle two comprise a two-tier linear corrugated structure.

It should be emphasised that any type of dot-core, straight-line, wavy or discontinuous fin or distributor/collector member can be produced by the invention, subject to the usual superplastic forming strain/dimensional limitations and subject also to the limiting parameters for diffusion bonding. No matter what types of fin and distributor/collector members are utilised in the design, the invention enables them to be formed simultaneously from the same superplastically deformable continuous sheet or sheets in the stack This means that there is a continuous transition between the distributor members and the fin members in every case; no joining of preformed membranes, sheets or other components by brazing or welding is required Consequently, very compact heat exchanger elements of high mechanical integrity can be produced.

Due to their high mechanical integrity, an important attribute of the heat exchanger elements produced by SPF/DB techniques is their ability to withstand high pressure differentials between their interiors and their exteriors. This is because their diffusion bonded joints exhibit the same strength properties as the parent metal Furthermore, because the diffusion bonded joints are metallurgically the same as the surrounding metal, they are not any more prone to attack by chemically aggressive heat exchange media than the rest of the element structure.

Figure 8:
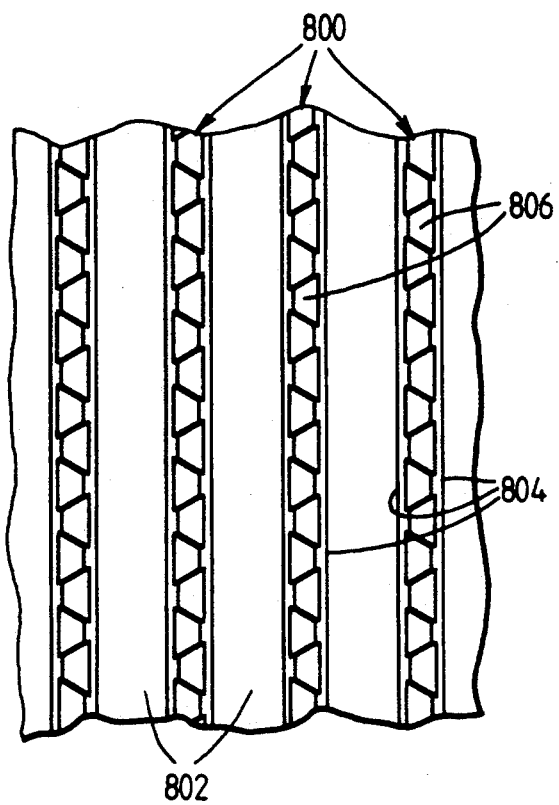
FIGS. 8 and 9 represent sectional side elevations of parts of two different heat exchanger matrices both incorporating the type of heat exchange element shown in FIG. 5.

The heat exchanger elements described with reference to FIGS. 2 to 7 can readily be used in a simple type of heat exchanger matrix as shown in FIG. 8. In this type of matrix, the identical individual elements 800 are spaced apart from one another. A first heat exchange medium (say, hot gas at high pressure) flows through the elements 800, and a second medium (say, water at ambient temperature) is pumped through the spaces 802 between the elements. Heat is exchanged between the two media via the face sheets 804 of the elements, which provide the primary heat exchange surfaces, the internal expanded core structure 806 providing secondary heat exchange surfaces or fins in the flow path of the first heat exchange medium.

Whereas the above description has mentioned only planar outer sheets in the finished heat exchange element, there is no reason why they should not have corrugated, curved or other shapes provided suitably shaped dies are used during the superplastic forming stage. For instance, for use in the type of heat exchanger matrix shown in FIG. 8, the external surfaces of the face sheets 804 could be given enhanced heat transfer properties by embossing them with arrays of raised dots, linear ridges or lozenge shapes, such embossing occurring simultaneously with final forming of the element in the dies.

Figure 9:
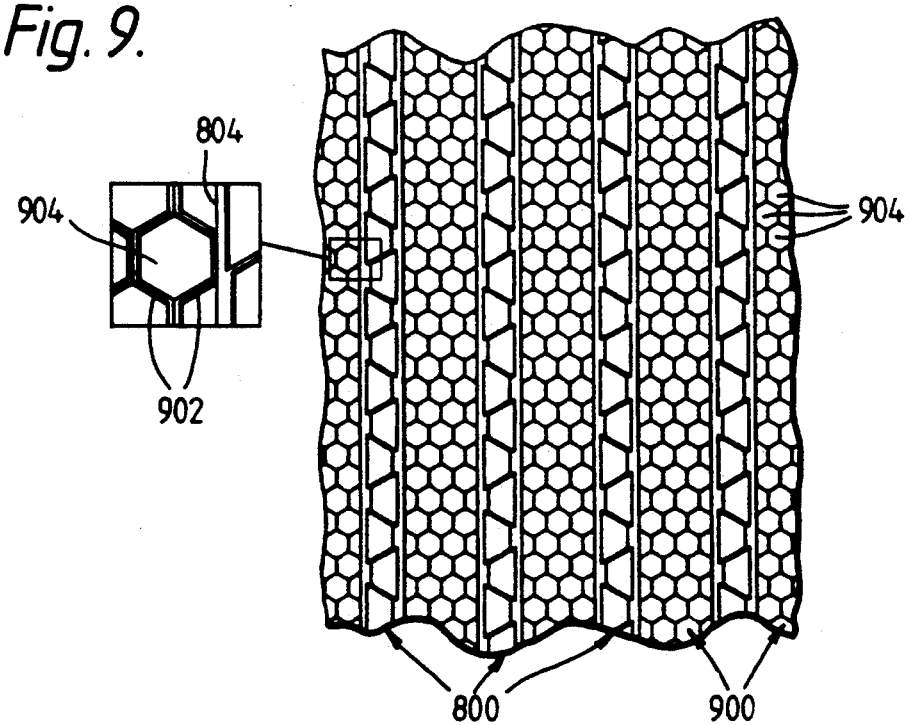

FIG. 9 shows a second simple type of heat exchanger in which diffusion bonded, superplastically formed heat exchanger elements 800 are again arranged side by side and spaced apart from each other in a matrix. Details are the same as already explained for FIG. 8, except that the spaces between the unitary elements 800 are each filled with a honeycomb-type fin structure 900 comprising longitudinally corrugated sheets 902 (see inset enlargement) which are bonded to each other and to the face sheets 804 of the elements 800. The walls of the longitudinal passages 904 formed by the corrugated sheets 902 provide secondary heat exchange surfaces or fins in the flow path of the second heat exchange medium. Each fin structure 900 is amenable to manufacture by conventional brazing techniques or activated diffusion bonding. Alternatively, the same method as for the elements 800 may be used if desired. The complete heat exchanger matrix is achieved by brazing or activated diffusion bonding of opposed sides of the fin structures 900 to the face sheets 804 of the elements 800.

Figure 10:
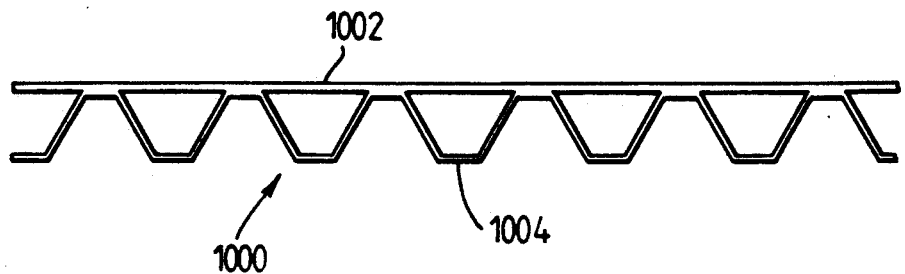
FIG. 10 is a sectional side elevation of a further type of heat exchanger element which can be produced according to the present invention.
Figure 11:
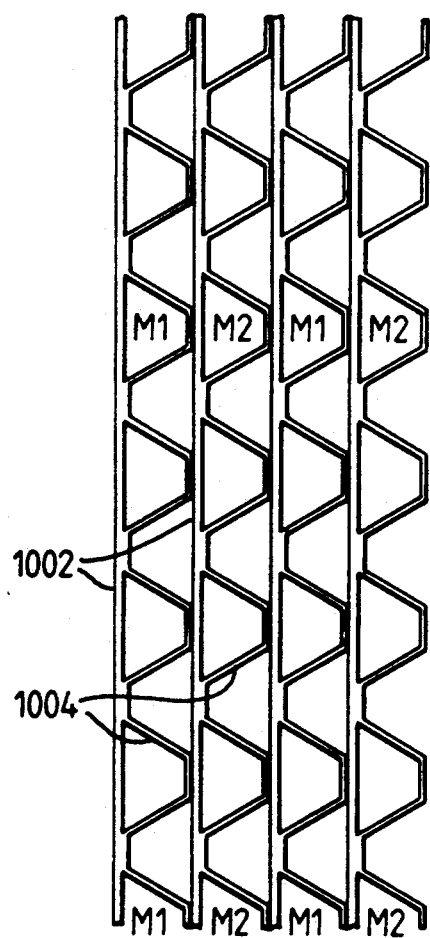
FIG. 11 is a sectional side elevation of part of a heat exchanger matrix incorporating the type of heat exchange element shown in FIG. 10.

The above description has focused on heat exchanger elements manufactured from stacks of three or more metal sheets. However, simple elements, comprising only a face sheet and an expanded corrugated core sheet, could also be formed. During the superplastic forming stage a suitably configured die surface would be required for the outside surface of the core sheet to expand against. An example of such an element 1000 is shown in FIG. 10, in this case comprising a planar face sheet 1002 and an expanded corrugated core sheet 1004. Such elements could be brazed or activated diffusion bonded together into matrices like that shown in FIG. 11, in which adjacent core layers 1004 are partitioned from each other by the face sheets 1002 acting as separating plates. Adjacent core layers 1004 would carry different heat exchange media M1,M2 so that the separating plates 1002 would be the primary heat exchange surfaces, the internal expanded core layers 1004 providing secondary heat exchange surfaces or fins in the flow paths of both heat exchange media.

It should be noted that the type of "dot core" structure shown in FIGS. 3 and 6 is not suitable for elements made only of two sheets. Nevertheless, it would be possible to have a dot core type of structure in a heat exchanger element comprising only two diffusion bonded unitary sheets. The distributor, and/or the main heat exchange region, would comprise an array of superplastically formed hollow projections projecting outwardly from only one side of the superplastically deformed core sheet. Hence, the ends of the projections would be diffusion bonded to the adjacent face sheet, the other side of the core sheet being formed by expansion against a die surface having a desired contour.

Mention should also be made of the fact that although titanium metal sheets have been specifically mentioned as superplastically deformable and as able to be utilised to practice the invention, no limitation is thereby intended As is well known, other materials, such as aluminium and stainless steel, are also capable of superplastic deformation and can be used in the present invention subject to adherence to the appropriate process parameters.

Furthermore, whereas the above described heat exchange elements incorporate regions adapted as distributors and as collectors, elements without regions specifically adapted as collectors should also be counted as within the ambit of the invention.

We claim:

1. A heat exchanger element comprising:
a core layer for flow of heat exchange fluid therethrough, and
fluid inlet and outlet means communicating with the core layer;
the core layer including:
a main heat exchange region containing heat exchange surfaces, and;
a distributor region containing flow intercepting surfaces, the distributor region extending between the main heat exchange region and the inlet means so as to distribute the fluid flow across the extent of the core layer;
the heat exchange element comprising at least two unitary sheets of metal joined together by diffusion bonded joints in selected places, which joints are metallurgically the same as, and exhibit the same strength properties as, the unitary sheets, at least one of the unitary sheets exhibiting superplastic deformation in at least some of the places where it is not diffusion bonded to a neighboring layer, such that the at least one unitary sheet forms the core layer and defines therein the flow intercepting surfaces in the distributor region as well as the heat exchange surfaces in the main heat exchange region, said flow intercepting surfaces in the distributor region comprising corrugations in the at least one superplastically deformed sheet, the corrugations being arranged to convey the heat exchange fluid from the inlet means to the main heat exchange region.

2. A heat exchanger element comprising:
a core layer for flow of heat exchange fluid therethrough, and
fluid inlet and outlet means communicating with the core layer;
the core layer including:
a main heat exchange region containing heat exchange surfaces, and;
a distributor region containing flow intercepting surfaces, the distributor region extending between the main heat exchange region and the inlet means so as to distribute the fluid flow across the extent of the core layer;
the heat exchange element comprising at least two unitary sheets of metal joined together by diffusion bonded joints in selected places, which joints are metallurgically the same as, and exhibit the same strength properties as, the unitary sheets, at least one of the unitary sheets exhibiting superplastic deformation in at least some of the places where it is not diffusion bonded to a neighboring layer, such that the at least one unitary sheet forms the core layer and defines therein the flow intercepting surfaces in the distributor region as well as the heat exchange surfaces in the main heat exchange region, said at least one superplastically deformed sheet having a relatively undeformed transitional portion between a part of itself which is deformed so as to define the heat exchange surfaces in the main heat exchange region and another part of itself which is deformed so as to define the flow intercepting surfaces in the distributor.

3. A heat exchanger element comprising:
a core layer for flow of heat exchange fluid therethrough, and
fluid inlet and outlet means communicating with the core layer;
the core layer including:
a main heat exchange region containing heat exchange surfaces, and;
a distributor region containing flow intercepting surfaces, the distributor region extending between the main heat exchange region and the inlet means so as to distribute the fluid flow across the extent of the core layer;
the heat exchange element comprising at least two unitary sheets of metal joined together by diffusion bonded joints in selected places, which joints are metallurgically the same as, and exhibit the same strength properties as, the unitary sheets, at least one of the unitary sheets exhibiting superplastic deformation in at least some of the places where it is not diffusion bonded to a neighboring layer, such that the at least one unitary sheet forms the core layer and defines therein the flow intercepting surfaces in the distributor region as well as the heat exchange surfaces in the main heat exchange region, said heat exchanger element comprising at least three unitary sheets of metal joined by diffusion bonding in selected places, the flow intercepting surfaces in the distributor region comprising first and second sets of superplastically formed hollow projections, the first set of hollow projections projecting outwardly from a first side of the at least one superplastically deformed sheet, and the second set of hollow projections projecting outwardly from a second side of the at least one superplastically deformed sheet, the ends of the projections being diffusion bonded to the two adjacent sheets.

* * * * *